Figure 1:
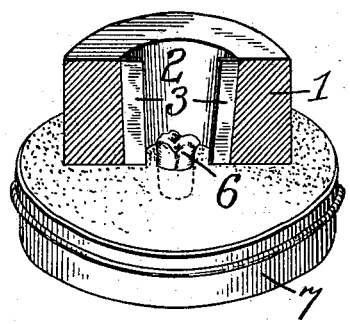

No. 747,800. PATENTED DEC. 22, 1903.
G. B. STONE.
PROCESS OF MOLDING AND BISCUITING ARTICLES FROM PORCELAIN, &c.
APPLICATION FILED DEC. 15, 1902.
NO MODEL.

Witnesses:

Inventor:
Gustin B. Stone,
By Geo. E. Waldo,
Atty

No. 747,800.

Patented December 22, 1903.

UNITED STATES PATENT OFFICE.

GUSTIN B. STONE, OF CHICAGO, ILLINOIS.

PROCESS OF MOLDING AND BISCUITING ARTICLES FROM PORCELAIN, &c.

SPECIFICATION forming part of Letters Patent No. 747,800, dated December 22, 1903.

Application filed December 15, 1902. Serial No. 135,194. (No model.)

*To all whom it may concern:*

Be it known that I, GUSTIN B. STONE, a citizen of the United States, and a resident of Chicago, in the county of Cook and State of Illinois, have invented an Improved Process of Molding and Biscuiting Articles from Porcelain and the Like, of which the following is a specification.

This invention relates to the art or process of manufacturing artificial teeth and other articles from porcelain or other plastic material, and relates particularly to the art or process of molding and cohering or partially biscuiting the desired article preparatory to its final baking.

At the present time porcelain teeth are procured by dentists from manufacturers or dealers from stock. When a dentist has occasion to replace a tooth, he selects a stock tooth which most nearly conforms in shape and color to the tooth removed. This method is objectionable for the reason that at best only an approximation, more or less close, of the tooth to be replaced can be secured and for the further reason that it necessitates carrying a large assortment of teeth in stock, particularly by dentists practicing in small places where they cannot readily renew their stocks.

The primary object of the invention is to provide a simple process for manufacturing artificial teeth and other articles from porcelain or the like which may be conveniently practiced by dentists and others at their own laboratories or elsewhere. In this manner it is rendered possible for dentists to make artificial teeth as they want them for use and where the tooth to be replaced has been removed in a good state of preservation to produce an exact duplicate of said tooth.

Briefly stated, my improved process consists in forming a mold for the tooth or other article of fusible metal, preferably of greater specific gravity than the porcelain or other material from which the tooth or other article is to be made, the fusing-point of said metal being not less and preferably slightly higher than the temperature at which porcelain or other material in a plastic state will cohere or partially biscuit, in filling said mold with porcelain or other material in a plastic state, and in then fusing said mold, thereby releasing and partially biscuiting said tooth or other article. When the metal of which the mold is formed is of greater specific gravity than the porcelain or other material, it is obvious that as soon as the mold is fused the tooth or other article will float in the molten metal and may be conveniently removed therefrom and placed in a suitable furnace to be baked to a desired degree of hardness.

In the accompanying drawings what I consider the preferable form of apparatus for practicing my improved process is fully illustrated.

Figure 2:
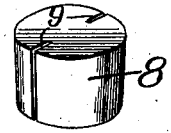
Figure 3:
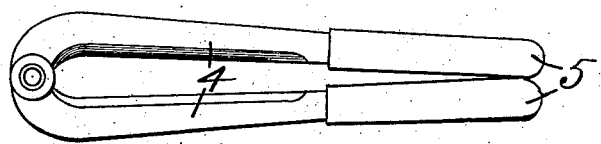

Figure 1 is a perspective view showing the parts assembled for casting the mold around the form or pattern, the molding-ring being shown in section. Fig. 2 is a perspective view of the mold removed from the molding-ring and the slotting-strips removed therefrom to form the mold-dividing slots, and Fig. 3 is a knife for dividing the mold.

Referring now to the drawings, 1 designates the molding-ring for forming the mold. Said ring is made of metal, as brass or iron, of any desired size—say two inches in diameter and one inch in thickness. Formed in said ring is an opening 2, which tapers from top to bottom.

The mold-dividing knife (shown in Fig. 3) consists of two metal blades 4, pivoted to each other at one end and provided with handles 5 on their opposite ends. The edges of the blades 4 are preferably blunt, being preferably beveled at desired angles to form wedges. Thus when shut upon an article with a strong pressure they will exert a wedging action, tending to break said article apart instead of cutting it.

Having thus described suitable apparatus for use in the practice of my improved process, I will now describe the process itself.

The first step is the formation of the mold. To accomplish this, the form or pattern 6 is embedded in a base of plastic material, as moist clay, so that only the part thereof to be reproduced will project therefrom. The slotting-strips 3 are then secured in the bed of plastic material on opposite sides of the form or pattern, so as to define the desired line of division of the mold. The molding-ring 1 is then placed over said form or pattern, resting upon the base of plastic material, the position of the slotting-strips 3 being such that they will extend inwardly from the sides of the opening 2 in said molding-ring. For convenience I provide a box 7 of substantially the shape and size of an ordinary blacking-box, in which the clay or other plastic base is contained. By filling said box even full a body of clay having a plane surface can be readily formed. Said box is a convenience, however, and not an essential. The form or pattern 6 and the ring 1 being set up on the clay base, as described, molten metal is poured into the opening 2 of the ring 1 and allowed to harden around the form or pattern 6, after which it is removed from the ring 1 and forms the mold 8, the form or pattern 6 being embedded therein. For forming the mold 8 I use a lead alloy, which is comparatively soft and easy to break and which fuses at a temperature about the same as and preferably a little higher than that at which plastic porcelain or other material used will cohere or partially biscuit. In most cases, and in all cases where the form or pattern 6 is irregular, said die or pattern can only be removed from the mold 8 by dividing said mold. This can be easily accomplished by means of the knife shown in Fig. 2 in the following manner: By removing the slotting-strips 3 from the mold 8 longitudinal slots or grooves 9 are formed in the exterior surface of said mold substantially diametrically opposite each other. By inserting the edge of each knife-blade 4 into one of the grooves 9 and exerting a strong pressure on the handles 5 the mold 8, being made of comparatively weak and brittle metal, as stated, can easily be broken into separate parts, the edges of the knife-blades 4 being wedge shape and preferably thicker than the width of the slots 9, operating to break and not cut the mold. In this manner the broken faces of the mold will exactly conform to each other, so that after removing the die or pattern 6 the parts of said mold can be placed together in their original relative positions, leaving a cavity or opening in said mold which is an exact impression of the form or pattern 6. The mold 8 is then replaced in the molding-ring 1, which will operate to hold or clamp the halves of said mold together. Said ring 1 may thus appropriately be called a "combined molding and clamping ring." The cavity or recess in said mold 8 having been filled with plastic porcelain or other desired plastic material, said ring 1, holding or containing the mold 8, is subjected to heat, preferably in a suitable receptacle, until the mold 8 fuses, thus releasing the article contained therein, which will also be partially biscuited by the heat to which it has been subjected. Being of less specific gravity than the molten metal, said molded article will float thereon and can readily be removed therefrom by means of a pair of forceps or the like. Said molded article is now ready to be enameled and baked to a desired degree of hardness, which may be done in any suitable furnace. This step, however, forms no part of the present process, and no means are shown for accomplishing the same.

I claim—

1. The process of molding and cohering or biscuiting articles from porcelain and the like consisting in forming a fusible mold, filling the cavity or opening therein with plastic porcelain or the like and fusing said mold, substantially as described.

2. The process of molding and cohering or biscuiting articles from porcelain and the like consisting in casting a mold upon the form or pattern to be reproduced from suitable fusible metal, removing the die or pattern therefrom, filling the cavity or opening in said mold with plastic porcelain or the like and fusing said mold, substantially as described.

3. The process of molding and cohering or biscuiting articles from porcelain and the like consisting in casting a mold upon the form or pattern to be reproduced from suitable fusible metal, dividing said mold and removing the die or pattern therefrom, securing the parts of said mold together, filling the cavity or opening in said mold with plastic porcelain or the like and fusing said mold, substantially as described.

4. The process of molding and cohering or biscuiting articles from porcelain and the like, consisting in casting a mold upon the form or pattern to be reproduced from suitable fusible metal, grooving or slotting said mold, dividing said mold on the line of weakening formed by said slots or grooves and removing the die or pattern therefrom, securing the parts of said mold together, filling the opening or cavity therein with plastic porcelain or the like and fusing said mold, substantially as described.

In testimony that I claim the foregoing as my invention I affix my signature, in presence of two subscribing witnesses, this 9th day of December, A. D. 1902.

GUSTIN B. STONE.

Witnesses:
M. S. SOMERVILLE,
ROBERT J. SATCHPOLE.